United States Patent [19]

Fraser et al.

[11] Patent Number: 4,914,642
[45] Date of Patent: Apr. 3, 1990

[54] REMOTE SONIC LOCATION SYSTEM

[75] Inventors: David W. Fraser, E. Falmouth; Allen B. Griswold, N. Falmouth; Francis C. Lowell, Jr., Falmouth; Stanley I. Silverman, Rehobeth, all of Mass.

[73] Assignee: Ferranti O.R.E., Inc., Falmouth, Mass.

[21] Appl. No.: 146,238

[22] Filed: Jan. 20, 1988

[51] Int. Cl.$^4$ ................................................ G01S 3/80
[52] U.S. Cl. ...................................... 367/122; 367/129; 181/112
[58] Field of Search .................... 367/3, 4, 5, 6, 12, 367/20, 21, 76, 78, 96, 97, 98, 105, 117, 122, 129, 135, 153; 181/107, 112; 342/423, 424, 443, 444, 445, 446

[56] References Cited

U.S. PATENT DOCUMENTS

| | | | |
|---|---|---|---|
| 3,538,329 | 11/1970 | Niven et al. | 250/261 |
| 3,559,171 | 1/1971 | Raudsep et al. | 340/147 |
| 3,599,142 | 8/1971 | Rust et al. | 340/870.05 |
| 3,893,061 | 7/1975 | Slawsky et al. | 367/191 |
| 3,943,870 | 3/1976 | Paslay | 114/20 R |
| 4,387,376 | 6/1983 | Sherrill et al. | 342/424 |
| 4,422,076 | 12/1983 | Tricoles et al. | 342/450 |
| 4,458,341 | 7/1984 | Goebel | 367/43 |
| 4,626,860 | 12/1986 | Tricoles et al. | 342/442 |
| 4,638,320 | 1/1987 | Eggert et al. | 342/442 |
| 4,638,321 | 1/1987 | Drogin et al. | 342/444 |
| 4,642,649 | 2/1987 | Lightfoot et al. | 342/450 |
| 4,691,305 | 9/1987 | Kuck | 367/3 |
| 4,728,958 | 3/1988 | Choate | 342/424 |

Primary Examiner—Brian S. Steinberger
Attorney, Agent, or Firm—Nutter, McClennen & Fish

[57] ABSTRACT

A hydrophone (16) having a short-baseline array of transducers (12A, 12B, and 12C) as well as a long-baseline array of transducers (14A, 14B, and 14C) includes switches 30A, 30B, and 30C) for selectively connecting the outputs of the arrays to a cable (18) that carries the signals to processing circuitry (20) aboard an ocean-going vessel (24). The switches (30A, 30B and 30C) change state in accordance with the output of a narrow-band filter (42), which indicates whether the received signal is of a predetermined frequency and thus is likely to have been produced by an intended source. Due to the delay inherent in the narrow-band filter 42, the processing circuitry (20) thus processes the response of the long-baseline array to the first part of a beacon pulse and the response of the short-baseline array to the second part of the beacon pulse.

14 Claims, 4 Drawing Sheets

REMOTE SONIC LOCATION SYSTEM

BACKGROUND OF THE INVENTION

The present invention relates to the field of ultrashort-baseline acoustic navigation systems.

Such systems are used, for example, to locate the positions of underwater pingers, responders, or transponders relative to a surface ship. They typically operate in the 5–50-kHz frequency range and determine the bearing to a target by utilizing the phase differences between the signals received by three or more closely spaced acoustic receiving hydrophone elements. The phase differences indicate the angle between the incoming acoustic wavefronts and the plane of the hydrophone array elements. If the target is a responder or transponder, the target can be located in three dimensions using acoustic travel time to determine the target's range.

The different types of targets that these systems are capable of tracking have different advantages and disadvantages. Pingers are free-running acoustic sources that produce a short burst of fixed frequency acoustic energy (a "ping"), typically at a rate of one to four pings per second. Since pingers are usually battery powered and run continuously, they have relatively short lifetimes (compared with an equivalent-size transponder) and are usually inexpensive, having no receiver or trigger circuits.

Responders are acoustic sources like pingers, but they differ from pingers in that they emit a ping only when they are electrically triggered by, for example, a signal carried by the umbilical cable of a remotely operated vehicle. Responders often receive their power from the vehicle on which they are installed since electrical connections are already required for responder operation, and vehicle power is usually available. Since the time of transmission is known, responders are capable of providing slant-range as well as bearing information.

Transponders are similar to responders in that they are triggered; however, a transponder has an acoustic receiver built into it so that it can reply (with a known delay) to an acoustic interrogation of the correct frequency and pulse length. In this way, a typically battery-powered transponder can operate totally independently of other systems. Like a responder, a transponder can provide the navigation system with slant range as well as bearing.

Compared with pingers, transponders and responders provide a major advantage in the accuracy and flexibility of ultrashort-baseline navigation systems, particularly when the target is not directly underneath the surface ship. This is because the horizontal distance can be calculated much more accurately using known target depth and the measured slant range that can be obtained from pingers and responders than by using hydrophone-derived elevation angle and known target depth, as is required when one uses a pinger. This is true even though the pinger may have a higher update or ping rate.

Furthermore, transponder targets have a much longer operating life because they do not ping continuously; they ping only when interrogated. This is important, for example, when a transponder is left on the sea bottom to mark a location for return at a later date. On the other hand, the maximum update rate for transponders is lower than that for pingers, particularly at longer ranges (up to 2 km), when 2–4-second update periods are common.

As is well known to those skilled in the art, two arrays of hydrophone elements are commonly used in ultrashort-baseline systems. The first array, hereinafter referred to as the "large" array, typically has an element spacing of one to two wavelengths. The wide spacing results in fine bearing resolution but also in an ambiguous fix. For example, with a one-and-a-half-wave-length spacing, the large array produces seven possible fixes.

To resolve the ambiguity, ultrashort-baseline systems also use a second array, hereinafter referred to as the "small" array, whose elements are spaced apart by less than one-half wavelength at the highest operating frequency. Although the narrow spacing does not provide the accuracy of the large array, it provides unambiguous bearing information in the lower hemisphere and so resolves the ambiguity left by the large array.

Conventional systems do not use both arrays simultaneously; ordinarily, common cable conductors have been used to carry the signals from both arrays, and common processing circuitry has been used to process those signals. When such a system begins operation, it responds to the first one or more pings by processing the signals from the small array to obtain a coarse position. It then switches to the large array for subsequent pings to determine position more accurately, occasionally switching briefly back to the small array to insure that it has maintained "lock" on the proper choice among the possible fixes suggested by the large array.

Historically, such systems used pinger targets with update rates of one to four pings per second. This high update rate made it unlikely that the system would lose lock on the correct choice of target location if, for example, the target moved, the ship suddenly changed course, or the acoustic signals were not received for a few pings due to interference. As such systems begin to be used with transponders, however, a limitation in the above approach became apparent. Ultrashort-baseline navigation systems are now being used with transponders whose update rates are on the order of 2–10 seconds, the rate depending on the number of transponders, the interrogation sequence and the slant range.

Whereas their rapid update rates afford conventional systems a reasonable chance of maintaining the correct choice of fix on the large array, newer navigation systems using transponders can lose lock and must revert to the small array. Because some pings must be ignored on account of noise and other factors, it can take several tens of seconds to re-acquire lock.

One way to reduce this problem is to use signals from both arrays simultaneously, i.e., to process the signals from both arrays in parallel so that it is not necessary to switch between arrays. But the straightforward way of employing this approach is economically unattractive. If the system does not switch between arrays, some of the processing circuitry within the hydrophone has to be duplicated, and this increases hydrophone cost. It is important that hydrophone cost be kept as low as possible, however, because the hydrophone is typically located underwater at a position spaced significantly from the ship's hull, so it is subject to being lost or damaged. Moreover, the hydrophone is usually connected by a cable to processing circuitry on the ship, and processing the signals in parallel increases cable cost because it necessitates an increase in the number of cable conductors. Some of the apparatus aboard the ship also must be duplicated.

To avoid such duplication, one might attempt to employ conventional time-division multiplexing. However, the positions in time of zero crossings of the hydrophone signals must be known with great accuracy if the desired bearing accuracy is to be obtained, and this requirement dictates a multiplexer switching rate that would require expensive wide-bandwidth cabling. Moreover, even if the processing circuitry were placed in the hydrophone so that the bandwidth requirement did not increase cable cost, the circuitry for reconstituting the multiplexed signals would itself exert a significant cost penalty.

An object of this invention, therefore, is to obtain the benefits of continuously monitoring both arrays but to do so without suffering the drawbacks of an unnecessary duplication of components or the complication that would result from conventional multiplexing.

SUMMARY OF THE INVENTION

The foregoing and related objects are achieved in a hydrophone system in which the processing circuitry processes signals from only one array at a time. Switching circuitry in the hydrophone selects for transmission the signals from one array or the other. Unlike conventional multiplexer switches, however, the switching circuitry used in the present invention remains in one state until detection circuitry detects that a pulse of the expected frequency is being received. When such detection occurs, processing circuitry for determining bearing will have received the response of one of the arrays to the first portion of the pulse, and the switching then interrupts the signals from that array and forwards the signals from the other array. In this way, the processing signal receives the first part of the pulse from one of the arrays and the second part of the pulse from the other array. This is achieved without the wide bandwidth required for conventional multiplexing, yet the high-accuracy zero-crossing information required of sonic location systems is retained.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
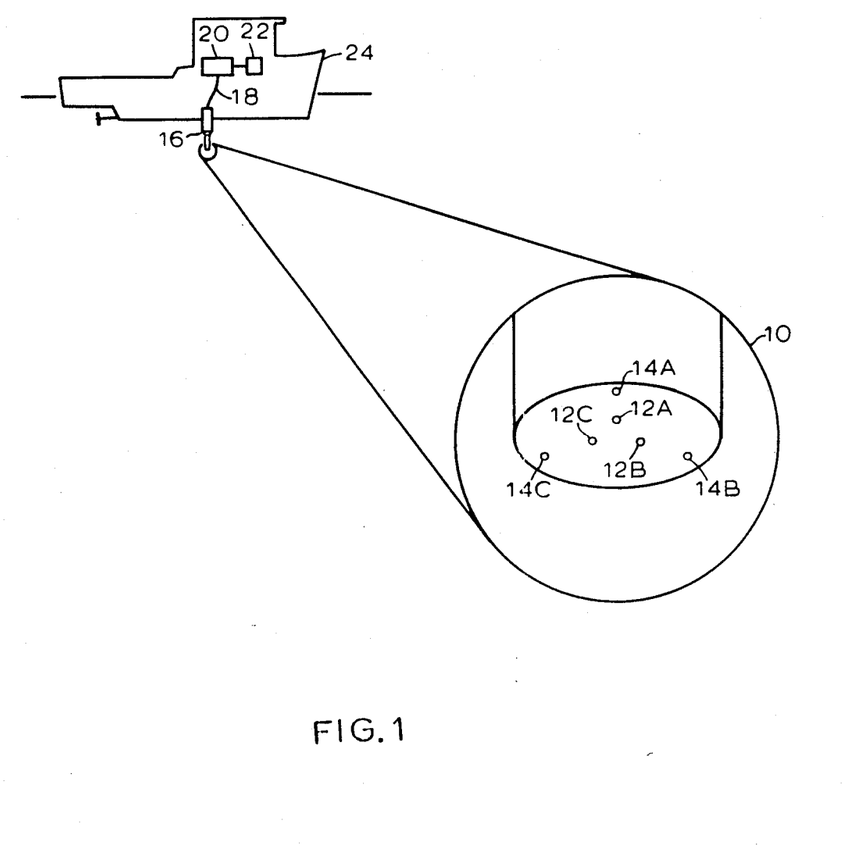
FIG. 1 is a diagram depicting two transducer arrays employed in a hydrophone used in an embodiment of the present invention and illustrating the relative positions of the hydrophone and the circuitry that processes the hydrophone signals.

A detail portion 10 of FIG. 1 depicts the arrangement of the transducer elements in the hydrophone array. Transducer elements 12A, 12B, and 12C are typically disposed at the vertices of an equilateral triangle and spaced apart by a distance that is less than one-half the wavelength of the signal frequency or frequencies of interest. Those skilled in the art will recognize that signals from elements spaced in this manner carry information sufficient to determine unambiguously the bearing of the source of the sonic signals that the transducer receives. (Actually, an unambiguous fix can be obtained from elements that are up to one wavelength apart, but the determination is simpler if the elements are less than half a wavelength apart.) Precisely because the transducers are not spaced very far apart, however, the change in relative phase for a given change in bearing angle is not great, so the bearing resolution also is not great.

In order to increase accuracy, a second transducer array comprising transducers 14A, 14B, and 14C is provided. These transducers are spaced from each other by more than a wavelength. This spacing affords much greater bearing-angle resolution, but it introduces ambiguity. By using the determinations from both of the arrays, it is possible to achieve both high resolution and an unambiguous bearing determination.

Such an array is provided on a hydrophone 16 connected by means of a cable 18 to processing circuitry 20 that analyzes the hydrophone signals and indicates on a display 22 the bearing of a target whose signals the hydrophone 16 receives. The hydrophone 16 is disposed under water, while the processing circuitry 20 is disposed on the deck of a vessel 24.

Figure 2:
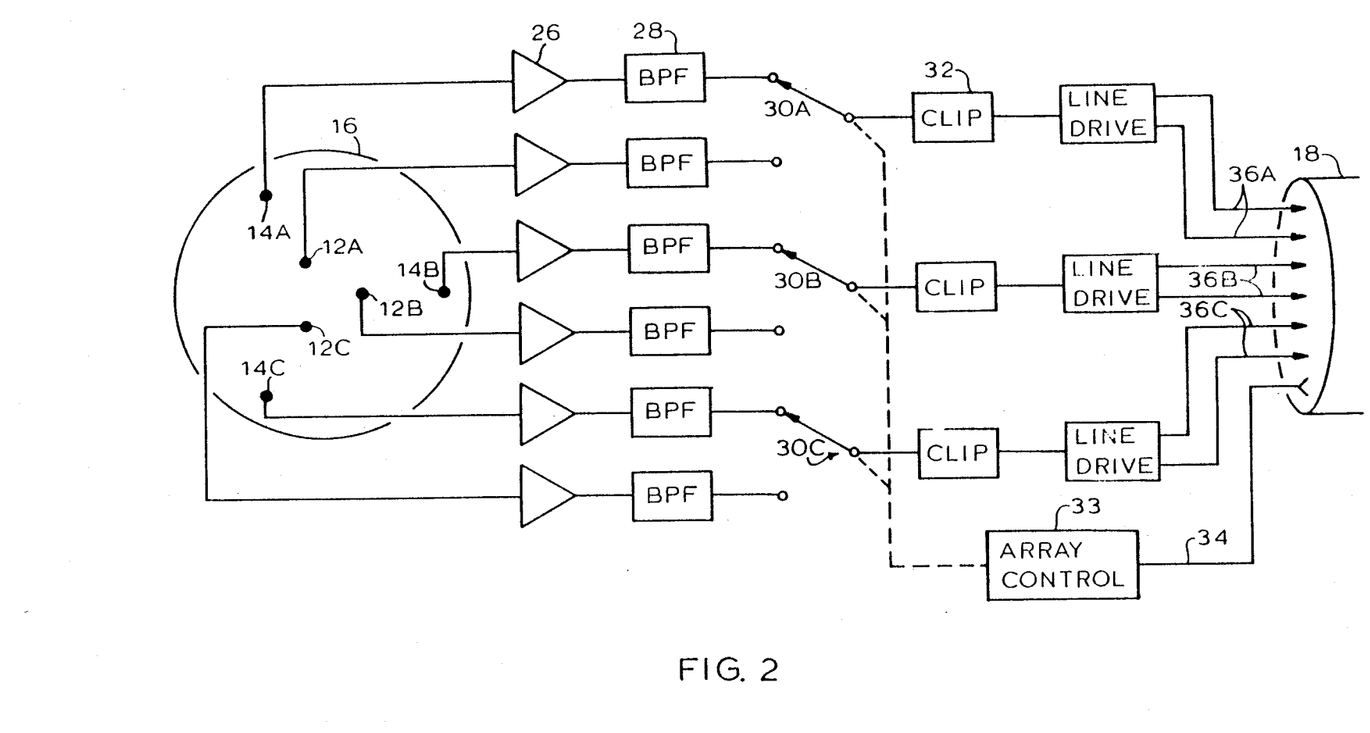
FIG. 2 is a block diagram of the hydrophone circuitry.

FIG. 2 depicts the hydrophone circuitry. Each transducer element is connected to a preamplifier such as preamplifier 26, which receives the output of transducer 14A. The output of preamplifier 26 is applied to a band-pass filter 28, whose output passes through a switch 30A to a hard limiter 32, which converts the sinusoidal output of the band-pass filter 28 into a square wave. A line driver 33 sends this signal by way of cable 18 to the processing circuitry 20 on the vessel 24.

Switch 30A is one of three ganged switches 30A, 30B, and 30C, which are normally in the position shown in FIG. 2, in which they complete the signal channel from transducers 14A, 14B, and 14C to the processing circuitry 20. In the illustrated position, switches 30A, 30B, and 30C interrupt the short-baseline signal channel from the transducers 12A, 12B, and 12C of the short-baseline array. Switches 30A, 30B, and 30C are typically electronic switches controlled by an array-control circuit 33, which operates in response to signals on a signal line 34 that comes through the cable 18 from processing circuitry 20 depicted in more detail in FIG. 3.

Figure 3:
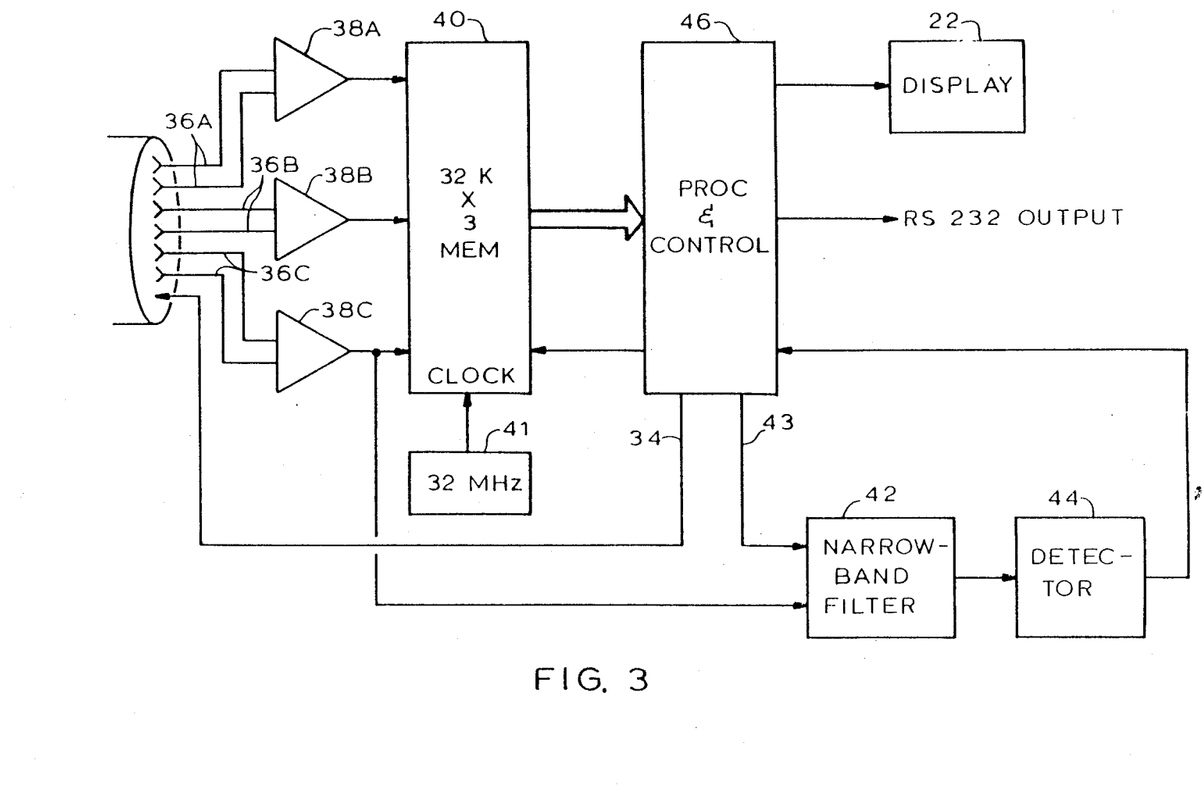
FIG. 3 is a block diagram of the processing circuitry.

FIG. 3 shows the three array-signal lines 36A, 36B, and 36C emerging from the cable 18 and connected to respective threshold circuits 38A, 38B, and 38C, which convert the hard-limited signals on lines 36A, 36B, and 36C to digital levels. These levels are applied to a 32K×3 memory 40, which can be thought of for present purposes as a three-bit-wide shift register clocked by a high-speed clock 41 whose repetition rate is 32 MHz. The memory 40 thus contains up to a 1.0-msec. record of the incoming signal.

Figure 4:
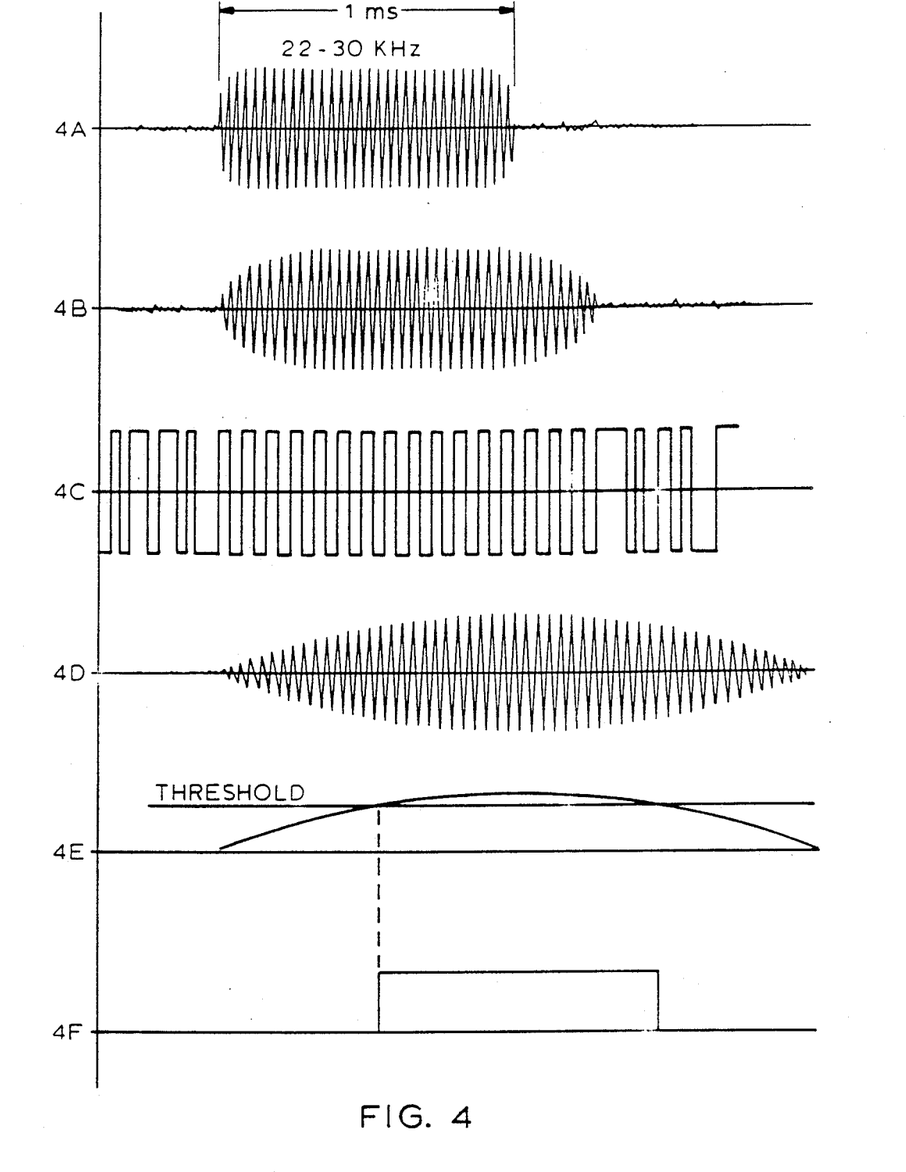
FIGS. 4A-4F are plots of typical signals generated during operation of the hydrophone and processing circuitry.

One of the hard-limited signals is also applied to a narrow-band filter 42, which is set by a signal on line 43 to a center frequency that coincides with the frequency at which the target transmits. Filter 42 has a narrower pass band than band-pass filter 28 (FIG. 4) does; its half-power bandwidth may be, for instance, 1.0 kHz. As a result, it takes filter 42 approximately 0.5 msec. to respond to a hard-limited signal of the desired frequency. When it does, the output of a detector 44 exceeds a threshold.

Processing-and-control circuitry 46 responds to passage through this threshold by starting to process the output of memory 40. It thereby begins with signals received 0.5 msec. before passage through the threshold. Circuitry 46 also responds to the transition through the threshold by changing the level on signal line 34, which is the line that controls the state of switches 30A, 30B, and 30C in FIG. 2. Those switches, which had been in the position in which they completed the channel from the long-baseline array, interrupt that channel and complete the channel from the short-baseline array. One-half millisecond later, the results of outputs of the short-baseline array begin to appear in the output of memory 40. The processing-and-control circuitry 46 begins to treat the output of memory 40 accordingly, and circuitry 46 can thereby resolve the ambiguity left by the processing of the long-baseline data. It then displays the results on display device 22 and may transmit them to other locations.

The advantages of this arrangement can be appreciated by referring to FIGS. 4A-4F. FIG. 4A depicts a typical pulse from a 30-kHz underwater beacon. The pulse lasts for just over a millisecond, so the pulse contains on the order of 30 cycles of the 30-kHz signal. This signal competes with noise from other sources, so it must be filtered by the band-pass filters. Band-pass filter 28 takes several cycles to reach a more or less steady-state response to this pulse, as FIG. 4B illustrates. As a result, the output of the hard limiter 32, which output is depicted in FIG. 4C, does not really represent a 30-kHz signal until after the first several cycles of the beacon pulse have been received. FIG. 4D illustrates that considerable further delay is imposed by the narrow-band filter 42, which, being only 1.0 kHz wide, cannot respond until the pulse is about half completed.

FIG. 4E represents the amplitude of the output envelope of the narrow-band filter 42 and shows that it reaches the threshold of the processing-and-control circuit 46 at about halfway through the pulse. FIG. 4F depicts an internal circuit-46 signal that represents comparison of the detector output with the threshold. When this signal goes high, the processing-and-control circuitry 46 switches between the arrays.

In effect, this arrangement gives the processing circuitry ten or fifteen cycles from which to derive the direction information from the long-baseline array. As was just explained, the first several cycles of the beacon pulse cannot be used. It is desirable for the processing circuitry to process the next several cycles from the long-baseline array rather than from the short-baseline array, because the first part of the pulse contains the higher-quality part of the signal; the later parts of the pulse are more likely to be corrupted by multi-path interference. Since it is the long-baseline array that gives the system its accuracy, the system "listens" to the long-baseline array during the early part of the pulse. The signals from the short-baseline array, which are used only to resolve ambiguity, are processed toward the end of the pulse.

It is now apparent why it is beneficial to base the switching time on a recognition that a signal of the predetermined type is being received. As was stated before, it would be possible to reduce the number of cable conductors by conventional multiplexing. However, this would double the size of the memory 40; bearing precision is determined to a great extent by the frequency with which the outputs of the threshold circuits 38A, 38B, and 38C are "sampled" by clocking memory 40. In order to obtain the resolution afforded by the illustrated systems, a system that uses conventional multiplexing would need two memories of the size of memory 40.

In the alternative, one might propose in light of the foregoing disclosure a multiplexing scheme in which the multiplexer switches between arrays only once every several cycles. For instance, if the switching occurred every half millisecond, the system would necessarily "listen" to part of the beacon-signal pulse from each array. However, the part of the pulse from the long-baseline array might be the later, low-quality part of the pulse, and it is preferable to process the higher-quality part of the pulse from the long-baseline array.

It would also be possible to switch at, say, twice that rate so that the system would necessarily process signals received by both arrays during the first half of the pulse. But this would result in signal segments that contain only a very few cycles, and the accuracy of the resulting bearing determination would suffer. Furthermore, the narrow-band filter 42, which must be employed to indicate to the processing and control circuitry 46 whether a bona fide beacon signal is being received, would not get a long enough signal from the single transducer to operate properly.

It is thus apparent that switching in response to the output of a narrow-band filter or equivalent criterion-imposing circuit provides significant advantages. This principle can be employed in wide variety of embodiments that differ to a greater or lesser extent from the embodiment depicted in the drawings. For instance, although the switches 30A, 30B, and 30C in FIG. 2 are interposed in the signal channels between the band-pass filters 28 and the hard limiters 32, they could also be interposed at other locations in the signal channel. For example, they could be positioned after the hard limiters 32, before the band-pass filters 28, or, in principle, before the preamplifiers 26. The earlier in the chain the switches are interposed, the greater the reduction is in transponder circuitry. However, we prefer to place the switches in the position indicated in FIG. 2 so as to have all of the band-pass-filter settling occur at the beginning of the pulse.

Additionally, there is no reason why the narrow-band filter 42 cannot be located in the hydrophone itself and thereby eliminate the need for the cable to carry conductor 34. But this would add to the hydrophone circuitry and would add the need for another conductor to transmit the output of the band-pass filter to the on-board circuitry, so we prefer to leave the narrow-band filter 42 in the on-board circuitry.

Finally, although the advantages of the present invention are especially apparent in systems in which the hydrophone is remote from the processing circuitry, certain advantages, such as reduction in circuitry duplication, result even in systems in which the processing circuitry is contained in the hydrophone.

Clearly, other variations can also be employed without departing from the basic principles of the present invention. Accordingly, the present invention constitutes a significant advance in the art.

What is claimed as new and desired to be secured by Letters Patent of the United States is:

1. In a sonic location system comprising a remote unit for sensing pulsed sonic signals and producing therefrom processing-unit input signals from which a direction of a source of the sonic signals can be deduced, a processing unit for processing the processing-unit input signals to generate a display that indicates the direction of the sonic signal source, and a cable connected between the remote unit and the processing unit for carrying the processing-unit input signals from the remote unit to the processing unit, the sonic location system comprising:

A. a long-baseline transducer array and a short-baseline transducer array, each array being located in the remote unit and comprising a plurality of sonic transducers for receiving the sonic signals and for producing electrical transducer signals in response to received sonic signals, at least a pair of the transducers of the long-baseline array being spaced apart by a first, relatively long distance to resolve the direction of the sonic signal source, and at least a pair of the transducers of the short-baseline array being spaced apart by a second, relatively short distance to resolve angular ambiguities in the long-baseline array;

B. signal-detection means for generating a switch-state signal whose value depends on whether the first portion of a single pulse being received by the transducer arrays is of a predetermined type;

C. interruptible long-baseline and short-baseline signal channels located in the remote unit for receiving the transducer signals from the long- and short-baseline arrays, respectively, each signal channel processing its respective received transducer signals to produce respective channel signals, and each signal channel applying its respective channel signals to the cable as the processing-unit input signals when that signal channel is completed but not when that signal channel is interrupted; and D. switching means, responsive to the switch-state signal, for selectively assuming first and second switch states and being interposed in the long-baseline and short-baseline signal channels, and to (i) in the first switch state, complete a first one of the long- and short-baseline signal channels and interrupt a second one thereof and (ii) in the second switch state, complete the second signal channel and interrupt the first signal channel, the switching means being responsive to the switch-state signal to assume one of the first or second switch states in accordance with the value of the switch-state signal.

2. The location system of claim 1 wherein the signal-detection means is located in the processing unit.

3. Apparatus as in claim 1 wherein the element spacing of the large-baseline array is greater than one wavelength of the received sonic signals.

4. Apparatus as in claim 1 wherein the element spacing of the short-baseline array is less than one wavelength of the received sonic signals.

5. In a sonic location system comprising a remote unit for sensing sonic signals and producing therefrom processing-unit input signals from which a direction of a source of the sonic signals can be deduced, a processing unit for processing the processing-unit input signals to generate a display that indicates the direction of the sonic signal source, and a cable connected between the remote unit and the processing unit for carrying the processing-unit input signals from the remote unit to the processing unit, the sonic location system comprising:

A. a long-baseline transducer array and a short-baseline transducer array, each array being located in the remote unit and comprising a plurality of sonic transducers for receiving the sonic signals and for producing electrical transducer signals in response to received sonic signals, at least a pair of the transducers of the long-baseline array being spaced apart by a first, relatively long distance to resolve the direction of the sonic signal source, and at least a pair of the transducers of the short-baseline array being spaced apart by a second, relatively short distance to resolve angular ambiguities in the long-baseline array;

B. signal-detection means for generating a switch-state signal whose value depends on whether signals received by the transducer arrays are of a predetermined type, including:
  i. a bandpass filter, connected to receive one of the processing-unit input signals, for producing a band-limited filter output therefrom;
  ii. threshold means, connected to receive the band-limited filter output, for generating as the switch-state signal a signal having one value when the band-limited filter output exceeds a predetermined threshold and another value when the band-limited filter output does not exceed the predetermined threshold.

C. interruptible long-baseline and short-baseline signal channels located in the remote unit for receiving the transducer signals from the long- and short-baseline arrays, respectively, each signal channel processing its respective received transducer signals to produce respective channel signals, and each signal channel applying its respective channel signals to the cable as the processing-unit input signals when that signal channel is completed but not when that signal channel is interrupted; and D. switching means, responsive to the switch-state signal, for selectively assuming first and second switch states and being interposed in the long-baseline and short-baseline signal channels, and to (i) in the first switch state, complete a first one of the long- and short-baseline signal channels and interrupt a second one thereof and (ii) in the second switch state, complete the second signal channel and interrupt the first signal channel, the switching means being responsive to the switch-state signal to assume one of the first or second switch states in accordance with the value of the switch-state signal.

6. The location system of claim 5 wherein the processing unit comprises:

A. memory means, responsive to the processing-unit input signals, for maintaining as contents a record of the processing-unit input signals that were most recently received; and B. bearing-determination means, responsive to the band-limited filter output and the memory means, for determining the bearing of the source of the sonic signals by processing, as the output of the first signal channel, the contents of the memory means received at the time when the threshold means determined that the band-limited filter output reached the predetermined threshold, and then processing subsequently received contents of the memory means as the output of the second signal channel.

7. In a sonic location system comprising a remote unit for sensing sonic signals and producing therefrom processing-unit input signals from which a direction of a source of the sonic signals can be deduced, a processing unit for processing the processing-unit input signals to generate a display that indicates the direction of the sonic signal source, and a cable connected between the remote unit and the processing unit for carrying the processing-unit input signals from the remote unit to the processing unit, the sonic location system comprising:

A. a long-baseline transducer array and a short-baseline transducer array, each array being located in the remote unit and comprising a plurality of sonic transducers for receiving the sonic signals and for producing electrical transducer signals in response to received sonic signals, at least a pair of the transducers of the long-baseline array being spaced apart by a first, relatively long distance to resolve the direction of the sonic signal source, and at least a pair of the transducers of the short-baseline array being spaced apart by a second, relatively short distance to resolve angular ambiguities in the long-baseline array;

B. signal-detection means for generating a switch-state signal whose value depends on whether signals received by the transducer arrays are of a predetermined type;

C. interruptible long-baseline and short-baseline signal channels located in the remote unit for receiving the transducer signals from the long- and short-baseline arrays, respectively, each signal channel processing its respective received transducer signals to produce respective channel signals, and each signal channel applying its respective channel signals to the cable as the processing-unit input signals when that signal channel is completed but not when that signal channel is interrupted;

D. switching means, responsive to the switch-state signal, for selectively assuming first and second switch states and being interposed in the long-baseline and short-baseline signal channels, and to (i) in the first switch state, complete a first one of the long- and short-baseline signal channels and interrupt a second one thereof and (ii) in the second switch state, complete the second signal channel and interrupt the first signal channel, the switching means being responsive to the switch-state signal to assume one of the first or second switch states in accordance with the value of the switch-state signal. wherein the processing unit comprises:

E. memory means, responsive to the processing-unit input signals, for maintaining as contents a record of the processing-unit input signals that were most recently received; and F. bearing-determination means, responsive to the band-limited filter output and the memory means, for determining the bearing of the source of the sonic signals by processing, as the output of the first signal channel, the contents of the memory means received at the time when the threshold means determined that the band-limited filter output reached the predetermined threshold, and then processing subsequently received contents of the memory means as the output of the second signal channel.

8. A sonic location system comprising:

A. a long-baseline transducer array and a short-baseline transducer array, each array being located in the remote unit and comprising a plurality of sonic transducers for receiving pulsed sonic signals and for producing electrical transducer signals in response to received sonic signals, at least a pair of the transducers of the long-baseline array being spaced apart by a first, relatively long distance to resolve the direction of the sonic signal source, and at least a pair of the transducers of the short-baseline array being spaced apart by a second, relatively short distance to resolve angular ambiguities in the long-baseline array;

B. signal-detection means for generating a switch-state signal whose value depends on whether the first portion of a single pulse received by the transducer arrays is of a predetermined type;

C. interruptible long-baseline and short-baseline signal channels located in the remote unit for receiving the transducer signals from the long- and short-baseline arrays, respectively, each signal channel processing its respective received transducer signals to produce respective channel signals, and each signal channel applying its respective channel signals to the cable as the processing-unit input signals when that signal channel is completed but not when that signal channel is interrupted; and D. switching means, responsive to the switch-state signal, for selectively assuming first and second switch states and being interposed in the long-baseline and short-baseline signal channels, and to (i) in the first switch state, complete a first one of the long- and short-baseline signal channels and interrupt a second one thereof and (ii) in the second switch state, complete the second signal channel and interrupt the first signal channel, the switching means being responsive to the switch-state signal to assume one of the first or second switch states in accordance with the value of the switch-state signal.

9. Apparatus as in claim 8 wherein the element spacing of the large-baseline array is greater than one wavelength of the received sonic signals.

10. Apparatus as in claim 8 wherein the element spacing of the short-baseline array is less than one wavelength of the received sonic signals.

11. A sonic location system comprising:

A. a long-baseline transducer array and a short-baseline transducer array, each array being located in the remote unit and comprising a plurality of sonic transducers for receiving the sonic signals and for producing electrical transducer signals in response to received sonic signals, at least a pair of the transducers of the long-baseline array being spaced apart by a first, relatively long distance sufficient to resolve the direction of the sonic signal source, and at least a pair of the transducers of the short-baseline array being spaced apart by a second, relatively short distance sufficient to resolve angular ambiguities in the long-baseline array;

B. signal-detection means for generating a switch-state signal whose value depends on whether the signals received by the transducer arrays are of a predetermined type, including:
  i. a bandpass filter, connected to receive one of the processing-unit input signals, for producing a band-limited filter output therefrom;
  ii. threshold means, connected to receive the band-limited filter output, for generating as the switch-state signal a signal having one value when the band-limited filter output exceeds a predetermined threshold and another value when the band-limited filter output does not exceed the predetermined threshold;

C. interruptible long-baseline and short-baseline signal channels located in the remote unit for receiving the transducer signals from the long- and short-baseline arrays, respectively, each signal channel processing its respective received transducer signals to produce respective channel signals, and each signal channel applying its respective channel signals to the cable as the processing-unit input signals when that signal channel is completed but not when that signal channel is interrupted; and D. switching means, responsive to the switch-state signal, for selectively assuming first and second switch states and being interposed in the long-baseline and short-baseline signal channels, and to (i) in the first switch state, complete a first one of the long- and short-baseline signal channels and interrupt a second one thereof and (ii) in the second switch state, complete the second signal channel and interrupt the first signal channel, the switching means being responsive to the switch-state signal to assume one of the first or second switch states in accordance with the value of the switch-state signal.

12. The sonic location system of claim 11 wherein the processing unit comprises:
A. memory means, responsive to the processing-unit input signals, for maintaining as contents a record of the processing-unit input signals that were most recently received; and
B. bearing-determination means, responsive to the band-limited filter output and the memory means, for determining the bearing of the source of the sonic signals by processing, as the output of the first signal channel, the contents of the memory means received at the time when the threshold means determined that the band-limited filter output reached the predetermined threshold, and then processing subsequently received contents of the memory means as the output of the second signal channel.

13. The location system of claim 8 wherein the processing unit comprises:
A. memory means, responsive to the processing-unit input signals, for maintaining as contents a record of the processing-unit input signals that were most recently received; and
B. bearing-determination means, responsive to the band-limited filter output and the memory means, for determining the bearing of the source of the sonic signals by processing, as the output of the first signal channel, the contents of the memory means received at the time when the threshold means determined that the band-limited filter output reached the predetermined threshold, and then processing subsequently received contents of the memory means as the output of the second signal channel.

14. A location system for determining the bearing of a pulsed signal source, the location system comprising:
A. a first array of transducers, with at least a pair of transducers spaced apart by a distance to resolve the bearing of the signal source, to thereby form a long-baseline array;
B. a second array of transducers, with at least a pair of the transducers spaced part by a distance to resolve ambiguities inherent in the long-baseline array, to thereby form a short-baseline array;
C. detection means, for determining if the first portion of a pulse output from the long-baseline array is a signal of a proper predetermined type;
D. means for processing the long- and short-baseline array outputs, by operating on the output of the long-baseline array output until such time as the detection means determines that the first portion of the long-baseline array output is of the proper predetermined type, and then afterwards operating on the short-baseline array output.

* * * * *